United States Patent [19]

Urban

[11] 4,368,866
[45] Jan. 18, 1983

[54] MOUNTING BRACKET AND MOUNTING ARRANGEMENT

[75] Inventor: Keith F. Urban, Elk Grove Village, Ill.

[73] Assignee: International Jensen Incorporated, Schiller Park, Ill.

[21] Appl. No.: 163,709

[22] Filed: Jun. 27, 1980

[51] Int. Cl.³ .............................................. E04G 3/00
[52] U.S. Cl. ............................. 248/286; 224/42.45 R; 312/323
[58] Field of Search ............... 248/286, 551, 552, 553; 312/323, 333, 313, 276, 242; 224/42.45 R

[56] References Cited

U.S. PATENT DOCUMENTS

| | | | |
|---|---|---|---|
| 675,172 | 5/1901 | Smith | 312/323 X |
| 1,327,977 | 1/1920 | Bennington | 312/323 X |
| 2,590,028 | 3/1952 | Miller | 312/323 |
| 3,033,508 | 5/1962 | Prohaska | 248/286 |
| 3,372,964 | 3/1968 | Eversman | 312/333 X |
| 3,658,399 | 4/1972 | Vogt | 312/333 X |
| 3,814,366 | 6/1974 | Staifer | 248/286 |
| 3,954,315 | 5/1976 | Sanden | 312/333 |
| 3,993,278 | 11/1976 | Race | 248/551 |
| 4,019,601 | 4/1977 | Giovanni | 312/313 X |
| 4,047,686 | 9/1977 | Porter | 248/552 |

Primary Examiner—J. Franklin Foss
Attorney, Agent, or Firm—Hume, Clement, Brinks, Willian & Olds, Ltd.

[57] ABSTRACT

A mounting bracket and an arrangement for mounting an electronic accessory device within the mounting bracket when installed in a vehicle not only holds the device for its intended use but also permits limited withdrawal for insured and normal access to the control panel for desired adjustment. The mounting bracket is comprised of a base plate and a pair of opposed, complementary flat arms depending from opposite ends of the base plate for stationing of an electronic device within the mounting bracket. Each of the arms includes a pair of channels for guiding displacement of the stationed device within the mounting bracket. One of the channels is generally straight, and the second of the channels is generally serpentine and spaced from the first channel between the first channel and the base plate. In the mounting arrangement, the device to be situated in the mounting bracket is provided with two pairs of pins, one pair protruding from each of opposed sides of the device and one of the pins engaging the first channel and the second pin engaging the second channel. One or more of the pins may be in the form of a thumb screw which protrudes through the channel and which may be tightened against the arm to lock the pin and the device at a predetermined displacement and inclination within the mounting bracket for viewing and access for performing desired adjustments.

10 Claims, 6 Drawing Figures

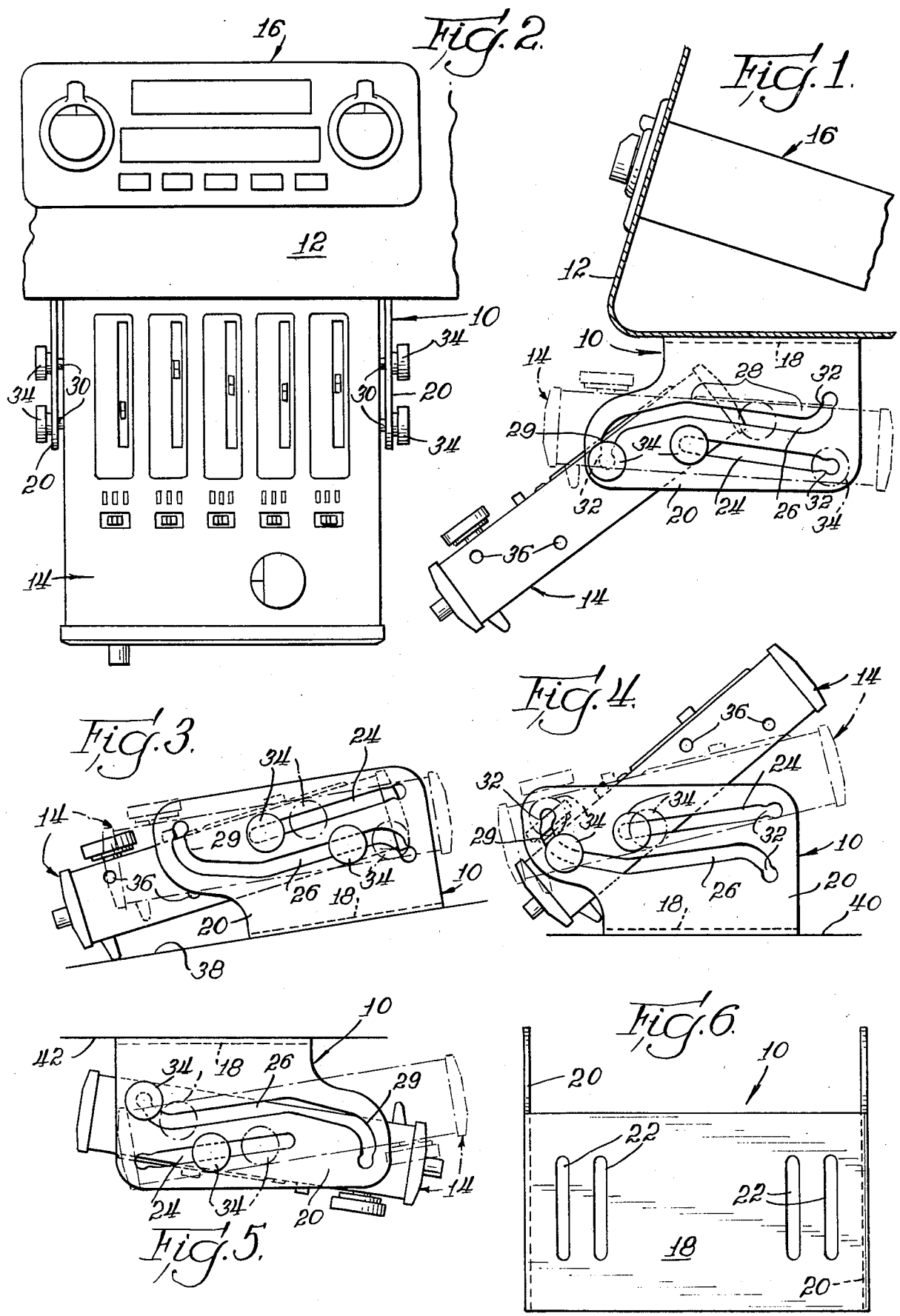

MOUNTING BRACKET AND MOUNTING ARRANGEMENT

BACKGROUND OF THE INVENTION

This invention relates to mounting brackets and an arrangement for mounting an electronic device within a mounting bracket. In particular, the invention pertains to a bracket which can be mounted in one of several positions while allowing the device stationed within the bracket to be withdrawn into a position where it is accessible and may be readily viewed for performing desired adjustments.

Mounting brackets, and in particular those mounting brackets which are used in a vehicle to mount electrical accessories, are well known. Accessories such as a radio receiver or tape deck, which are added to the vehicle after purchase, often are mounted under the dashboard or, if the vehicle is so equipped, upon the center console. Typically, the bracket used is fashioned so that the accessory is immovably fixed in whatever position it is mounted.

To prevent theft of such accessories, several mounting brackets have been developed to allow the owner to remove the accessory from the vehicle. However, such brackets allow only removal of the accessory, not repositioning of the accessory to aid the user's access to or sight of it.

Often, electrical accessories for a vehicle are crowded with various knobs and dials on the smallest end thereof, since the device is typically mounted underneath the vehicle dashboard. Were the accessory mounted so that a larger, flat surface were available for positioning of the dials and switches, the accessory would protrude too far into the passenger compartment, and interfere with the comfort of the vehicle's occupants.

SUMMARY OF THE INVENTION

The present invention provides a mounting bracket, and an arrangement for mounting an electronic accessory device within the mounting bracket, which allows displacement of the accessory within the mounting bracket to permit the working surface of the accessory (that is, the surface upon which all adjustment dials and switches are located) to be one of the larger surfaces of the accessory which is normally hidden from view. Yet, when the accessory is returned within the bracket to its rest or stored position, the accessory protrudes as little as possible into the occupant's compartment.

The mounting bracket is of the type having a base plate to facilitate fastening of the mounting bracket to a surface of the vehicle. A pair of opposed, complementary flat arms depend from opposite ends of the base plate for stationing of the accessory device within the mounting bracket. Each of the arms depends approximately perpendicular to the base plate and includes a pair of channels for guiding displacement of the stationed device within the mounting bracket. One of the channels is generally straight. The other of the channels is serpentine in a generally "S" shape and is spaced from the first channel. Typically, the arms form integral extensions of the base plate, and the channels form slots in the arms.

The second channel, which is of greatest length, is positioned on each arm between the first channel and the base plate. A portion of the second channel is straight and parallel to the first channel, while a curved leg of the second channel crosses the longitudinal axis of the first channel.

The arrangement for displaceably mounting the electronic accessory device includes the mounting bracket and a pair of pins protruding from each of opposite sides of the accessory, one of the pins engaging the first channel and the other engaging the second channel. The accessory is provided with a series of screw impressions along the opposite sides so that placement of the pins can be changed to alter orientation of the accessory.

To facilitate locking of the accessory at a particular viewing inclination, at least one of the pins may be in the form of a thumb screw protruding through the associated channel. A head is engaged upon the thumb screw and can be tightened against the arm to lock the pin (and therefore the accessory) at a desired location along the channel. Since the second channel is of a serpentine configuration, the inclination of the accessory can therefore be fixed by locking the thumb screw.

In order to aid in maintaining the accessory in its stored, unwithdrawn position, at least one of the channels is provided with a retention at one end. The retention comprises a neck or reduction of the width of the channel proximate that one end past which a pin may pass.

BRIEF DESCRIPTION OF THE DRAWING

The invention is described in greater detail in the following detailed description, taken in conjunction with the drawing, in which:

FIG. 1 is a side elevational illustration of a bracket according to the invention and the arrangement for mounting an accessory underneath the dashboard of a vehicle, FIG. 2 is a diagramatic view of the invention as depicted in FIG. 1, from the eye of the driver of the vehicle.

FIG. 3 is a side elevational illustration of another mode of the mounting arrangement according to the invention when the bracket is situated on a slanted vehicle console, FIG. 4 is a side elevational illustration of yet another mode of the invention when the mounting bracket is fastened to a horizontal vehicle console, FIG. 5 is a side elevational illustration of the mounting arrangement according to the invention when the mounting bracket is located in a ceiling position, and FIG. 6 is an enlarged rear elevational illustration of the mounting bracket showing slots for through-fastening of the bracket to an appropriate, disparate surface.

DESCRIPTION OF THE PREFERRED EMBODIMENTS

Shown in FIGS. 1 and 2 is a mounting bracket 10 according to the invention mounted under a vehicle dashboard 12. In the particular environment illustrated, the mounting bracket contains an electronic equalizer 14 which is used in combination with a stereo receiver 16. The particular equalizer illustrated is one manufactured by Jensen Sound Laboratories, Division of International Jensen, Inc., Schiller Park, Ill. and which is the subject of a co-pending design patent application entitled "Electronic Graphic Equalizer Or The Like" filed by the applicant of the present invention. Of course, any suitable accessory can be mounted in the bracket 10 as desired, and reference throughout this description to a particular accessory is for illustrative purposes, only.

The mounting bracket 10 is composed of a base plate 18 (FIG. 6) and a pair of opposed, complementary flat arms 20 depending from opposite ends of the base plate for stationing of the equalizer 14 in the mounting bracket. To affix the bracket 10 to a disparate surface, such as the vehicle dashboard 12, the base plate 18 is provided with a series of slots 22 through which fasteners may be passed and engaged within the structure of the dashboard 12. Alternatively, the slots 22 can be omitted and a suitable adhesive utilized to affix the base plate to the vehicle surface.

Each of the arms 20 is provided with a pair of channels 24 and 26 in the form of slots. The first channel 24 is generally straight and has a longitudinal axis lying generally horizontal, though not parallel to the base plate 18. The second channel 26 is generally serpentine in an "S" shape and is spaced from the first channel 24, situated between the first channel 24 and the base plate 18. The second channel 26 includes a straight channel portion 28 which lies generally parallel to the first channel 24. The second channel, due to its serpentine shape, also has a curved leg 29 which extends to cross the longitudinal axis of the first channel 24, as illustrated.

The equalizer 14, which is shown in bold form in the deployed position, and in phantom form in the stored or retracted position, is sandwiched between the arms 20 of the mounting bracket 10. The equalizer includes a pair of removable screws or pins 30 on each side thereof which engage the channels 24 and 26. As illustrated, the pins 30 extend into the channels 24 and 26 to guide displacement of the equalizer 14 within the mounting bracket 10. The pins 30 extend through the arms 20 sufficiently to accommodate heads 34. It is preferred that the pins 30 are thumb screws or the like and are threaded so that when the equalizer 14 is displaced into a desired position, the heads 34 can be tightened against the arms 20 to lock the equalizer at a desired inclination within the mounting bracket 10.

One or both of the channels 24 and 26 may be provided with a retention end including a neck or reduced width portion 32. The diameter of the pins 30 in the channels 24 and 26 is sufficient to just pass through the neck 32 so that, after passing through, the neck 32 acts to partially retain the pins 30.

As illustrated in FIG. 1, the equalizer 14 is provided with additional screw impressions 36 into which the pins 30 can be introduced in order that the equalizer 14 and bracket 10 may be mounted elsewhere in the vehicle and still permit ease of viewing of the equalizer 14 when in the deployed position. The geometric relationship between the location and spacing of the screw impressions 36 and the channels 24 and 26 will dictate the stored position of the equalizer 14 and the inclination to which the equalizer may be elevated within the mounting bracket 10. One such different mounting combination is shown in FIG. 4 and described in greater detail below.

FIG. 3 illustrates an alternative form of the invention in which the equalizer 14 is mounted upon a slanted console 38 such as a console typically found between individual bucket seats of an automobile. In this embodiment, the base plate 18 (FIG. 6) of the mounting bracket 10 is secured to the console 38. Since the console is on the vehicle floor, the equalizer 14 is inverted in position from that shown in FIG. 1 so that the equalizer is visible to the vehicle's occupants when looking down toward the equalizer. Again, the equalizer 14 is shown in bold form in the deployed position, and in phantom form in the retracted, or stored position. Also as shown in FIGS. 1 and 2, the pins 30 are provided with heads 34 which can be tightened against the arms 20 to lock the equalizer at a desired viewing inclination.

FIG. 4 illustrates employment of the invention on a relatively flat console 40 and represents location of the mounting bracket 10 close to the vehicle dashboard so that the inclination of the equalizer 14, when in the deployed position, must be steeper than that shown in FIG. 3 in order to be easily seen. To achieve this end, the pins 30 are removed from the positions shown in FIGS. 1 through 3 and are inserted in the screw impressions 36 (FIG. 1). Thus, with one of the pins 30 located in the left-most portion of the channel 26 (when the equalizer 14 is stored, as shown in phantom), and the other of the pins inserted within the channel 24, the pitch of the equalizer 14 can be greatly steepened, as illustrated, by slight translation of the equalizer 14 to the right as shown in FIG. 4.

Finally, FIG. 5 illustrates utilization of the invention in a ceiling-mounted environment. As shown, the mounting bracket 10 is affixed to the vehicle ceiling 42 and the equalizer 14 is carried within the mounting bracket 10 in the same manner as FIGS. 1 through 3. Again, the equalizer 14 is shown in the deployed position in bold lines and in the stored or retracted position in phantom. By suitable location of the pins 30 and displacement of the equalizer 14 within the mounting bracket 10, a desired inclination of the equalizer 14 can be achieved for ready access and viewing from below by the vehicle operator.

From the foregoing, it should be evident that the mounting bracket 10, in combination with suitable location of the pins 30 on opposite sides of the equalizer 14, provides a universally adaptable arrangement for mounting of the equalizer at any desired location within the occupant's compartment of vehicle. For example, and although not illustrated, it should be evident that, in particular situations, the bracket 10 can be mounted vertically, rather than horizontally as shown in FIGS. 1 through 5, and the equalizer can be inclined for proper viewing by suitable placement of the pins 30. Therefore, it will be seen that the mounting bracket 10 is essentially universal, in that one mounting bracket can be employed in any number of locations within a vehicle to situate the equalizer 14 for easy access and viewing.

Although the above description of the invention has dealt primarily with mounting of an equalizer 14 for access, it is apparent that many other devices, such as a radio receiver or tape deck, can be employed in combination with the bracket 10 and pins 30 as well. Furthermore, the mounting bracket 10 can be utilized in many places other than a vehicle. Various changes can be made to the invention without departing from the spirit thereof or scope of the following claims.

What is claimed is:

1. An arrangement for displaceably mounting a device upon a disparate surface, comprising:
   a. a mounting bracket for stationing of the device, said bracket having a base plate for fastening of the mounting bracket to the disparate surface,
   b. a pair of opposed, complementary flat arms depending from opposite ends of the base plate, each of said arms extending on an opposite side of the device,
   c. means for guiding displacement of the device on the mounting bracket, said guiding means comprising:

i. a first, generally straight channel in each said arm shaped to engage the stationed device, ii. a second, generally serpentine channel in each said arm spaced from said first channel and shaped to engage the stationed device, d. a pair of pins protruding from opposite sides of said device, one of said pins engaging one of said channels and the other of said pins engaging the other of said channels, e. at least one of said pins protruding through the associated channel, and further including a head engaged upon said protruding pin, said pin being threadedly engaged within the device such that said head can be tightened against said arm to lock said pin and said device at a desired location along said channel, and f. means for fastening of the mounting bracket to a disparate surface.

2. A mounting bracket according to claim 1 in which said arms form integral extensions of said base plate.

3. A mounting bracket according to claim 1 in which said channels form slots through said arms.

4. A mounting bracket according to claim 1 in which said second channel is positioned on said arm between said first channel and said base plate.

5. A mounting bracket according to claim 4 in which said second channel includes a straight channel portion which is parallel to said first channel.

6. A mounting bracket according to claim 4 in which said second channel includes a curved leg which crosses the longitudinal axis of, but is spaced from, said first channel.

7. A mounting bracket according to claim 1 in which at least one of said channels includes a retention at one end thereof.

8. A mounting bracket according to claim 7 in which said retention comprises a reduction of the width of said channel proximate said one end.

9. A mounting bracket according to claim 1 in which said fastening means comprises at least one fastener-receiving aperture in said base plate.

10. A mounting bracket according to claim 9 in which said fastener-receiving aperture is a slot.

* * * * *